Patented Dec. 2, 1930

1,783,744

UNITED STATES PATENT OFFICE

ALWIN MITTASCH, OF LUDWIGSHAFEN-ON-THE-RHINE, AND CARL MÜLLER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF IRON CARBONYL

No Drawing. Application filed March 25, 1926, Serial No. 97,466, and in Germany March 30, 1925.

The present invention relates to the manufacture of iron carbonyl from carbon monoxid and iron in a continuous process. It has been described in our prior application, Serial No. 5,619, that by passing carbon monoxid under a high pressure (about 50 atmospheres or more) at an elevated temperature (generally ranging between about 100 and 200° C.) over metallic iron with a speed sufficient to carry away the iron carbonyl formed, the carbonyl can be prepared continuously.

We have now found also that with ordinary or moderately elevated pressure and the step of employing sufficient speed of the gas current to avoid the deposition of liquid iron carbonyl on the iron mass, a reaction gas rich in iron carbonyl (say about 4 to 6 per cent by volume) can be obtained in the regular way, from which gases the iron carbonyl can be separated by cooling or absorption. With such lower pressure the temperature of the reaction will also be lower in view of the equilibrium of the reaction. For example at atmospheric pressure, iron carbonyl is formed at about 15° C., but with very low speed, and the latter is considerably increased by raising the temperature. Owing to the dissociation of iron carbonyl which is greater the higher the temperature, the yield decreases when the temperature exceeds about 60° C. When working at higher pressures the temperature can, however, be higher. Instead of carbon monoxid, gas mixtures containing the same may be employed for example water gas freed from carbon dioxid and containing, on an average, about 40 per cent of carbon monoxid. With such gases, in view of the reduced partial pressure of carbon monoxid, the total pressure of the gas mixture must exceed atmospheric pressure. An addition of small amounts of for example nickel, aluminium or bismuth or their compounds to the iron or of ammonia or methanol or formaldehyde vapors to the carbon monoxid is favorable to the speed of the reaction, while oxygen, carbon dioxid and other admixtures which may exert an oxidizing action on the iron should be excluded as far as possible, as even traces of such compounds often render the surface of the iron inactive for further reaction with carbon monoxid. It is also useful to employ the iron with metallic surfaces free of any superficial coating of iron oxid, and for this purpose either any oxidation of the iron metal should be avoided prior to the action of carbon monoxid, or, if such oxidation has already occurred, the iron should be broken into pieces or the oxid should be removed by a short reducing treatment before starting with the production of iron carbonyl.

What we claim is:

1. The process of manufacturing iron carbonyl which comprises passing over metallic iron a gas containing carbon monoxid under a pressure not exceeding 50 atmospheres and at an elevated temperature and with so great a speed that the iron carbonyl formed is substantially carried away with the gas current.

2. The process of manufacturing iron carbonyl which comprises passing over metallic iron a gas containing carbon monoxid under a pressure not exceeding 50 atmospheres and at an elevated temperature and with so great a speed that the iron carbonyl formed is substantially carried away with the gas current, separating the iron carbonyl from the gases, returning the residual gases to the metallic iron, the whole process being carried out in a circulating system without reducing the pressure.

3. The process of manufacturing iron carbonyl which comprises passing over metallic iron a gas containing carbon monoxid under a pressure not exceeding 50 atmospheres and at an elevated temperature in the presence of a catalytic substance and with so great a speed that the iron carbonyl formed is substantially carried away with the gas current.

4. The process of manufacturing iron carbonyl which comprises passing over metallic iron having metallic surfaces free from iron oxid a gas containing carbon monoxid under a pressure not exceeding 50 atmospheres and at an elevated temperature and with so great a speed that the iron carbonyl formed is substantially carried away with the gas current.

5. The process of manufacturing iron carbonyl which comprises passing over metallic iron a gas containing carbon monoxid but free from oxidizing admixtures under a pressure not exceeding 50 atmospheres and at an elevated temperature and with so great a speed that the iron carbonyl formed is substantially carried away with the gas current.

6. The process of manufacturing iron carbonyl which comprises passing over metallic iron a gas containing carbon monoxide at atmospheric pressure and at a temperature between about 15 and 100° C. and with so great a speed that the iron carbonyl formed is substantially carried away with the gas current.

In testimony whereof we have hereunto set our hands.

ALWIN MITTASCH.
CARL MÜLLER.